United States Patent
May et al.

(10) Patent No.: US 12,227,691 B2
(45) Date of Patent: Feb. 18, 2025

(54) BREAKABLE EMULSIFIERS

(71) Applicant: Halliburton Energy Services, Inc., Houston, TX (US)

(72) Inventors: Preston Andrew May, Porter, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 21 days.

(21) Appl. No.: 17/545,733

(22) Filed: Dec. 8, 2021

(65) Prior Publication Data

US 2023/0174841 A1    Jun. 8, 2023

(51) Int. Cl.
  *C09K 8/28*    (2006.01)
  *E21B 21/06*    (2006.01)

(52) U.S. Cl.
  CPC .............. *C09K 8/28* (2013.01); *E21B 21/063* (2013.01)

(58) Field of Classification Search
  CPC ........ C09K 8/28; C09K 2208/10; C09K 8/36; E21B 21/063
  See application file for complete search history.

(56) References Cited

U.S. PATENT DOCUMENTS

| | | | |
|---|---|---|---|
| 5,073,286 A | 12/1991 | Otten et al. | |
| 5,905,061 A | 5/1999 | Patel | |
| 6,214,236 B1 | 4/2001 | Scalliet | |
| 6,489,498 B2 | 12/2002 | Klein et al. | |
| 6,822,039 B1 | 11/2004 | Monfreux-Gaillard et al. | |
| 7,178,594 B2 | 2/2007 | Patel | |
| 7,410,934 B2 | 8/2008 | Hughes et al. | |
| 7,427,583 B2 | 9/2008 | Couillet et al. | |
| 8,459,360 B2 | 6/2013 | Pope et al. | |
| 2008/0121564 A1* | 5/2008 | Smith | C10G 1/00 208/13 |
| 2008/0236832 A1 | 10/2008 | Fu et al. | |
| 2011/0071056 A1 | 3/2011 | Saini et al. | |
| 2011/0217783 A1* | 9/2011 | Caprioli | C07C 69/732 436/86 |
| 2020/0369945 A1 | 11/2020 | Guo et al. | |
| 2021/0253519 A1 | 8/2021 | Ge et al. | |
| 2021/0292638 A1 | 9/2021 | Chopade et al. | |

FOREIGN PATENT DOCUMENTS

EP    0920484 B1 *    7/2004
JP    11-290610 A    10/1999

OTHER PUBLICATIONS

International Search Report and Written Opinion for PCT/US2022/041908 dated Dec. 20, 2022.

* cited by examiner

*Primary Examiner* — Kumar R Bhushan
(74) *Attorney, Agent, or Firm* — Thomas Rooney; C. Tumey Law Group PLLC

(57) ABSTRACT

A variety of methods and systems are disclosed, including, in one embodiment, a method for emulsion breaking including: applying a trigger to an oilfield emulsion to facilitate breaking of the oilfield emulsion, wherein the oilfield emulsion includes an oleaginous phase, a non-oleaginous phase, and a breakable emulsifier, wherein the trigger breaks the breakable emulsifier into non-emulsifying byproducts; and separating at least a portion of the oleaginous phase from the non-oleaginous phase.

19 Claims, 1 Drawing Sheet

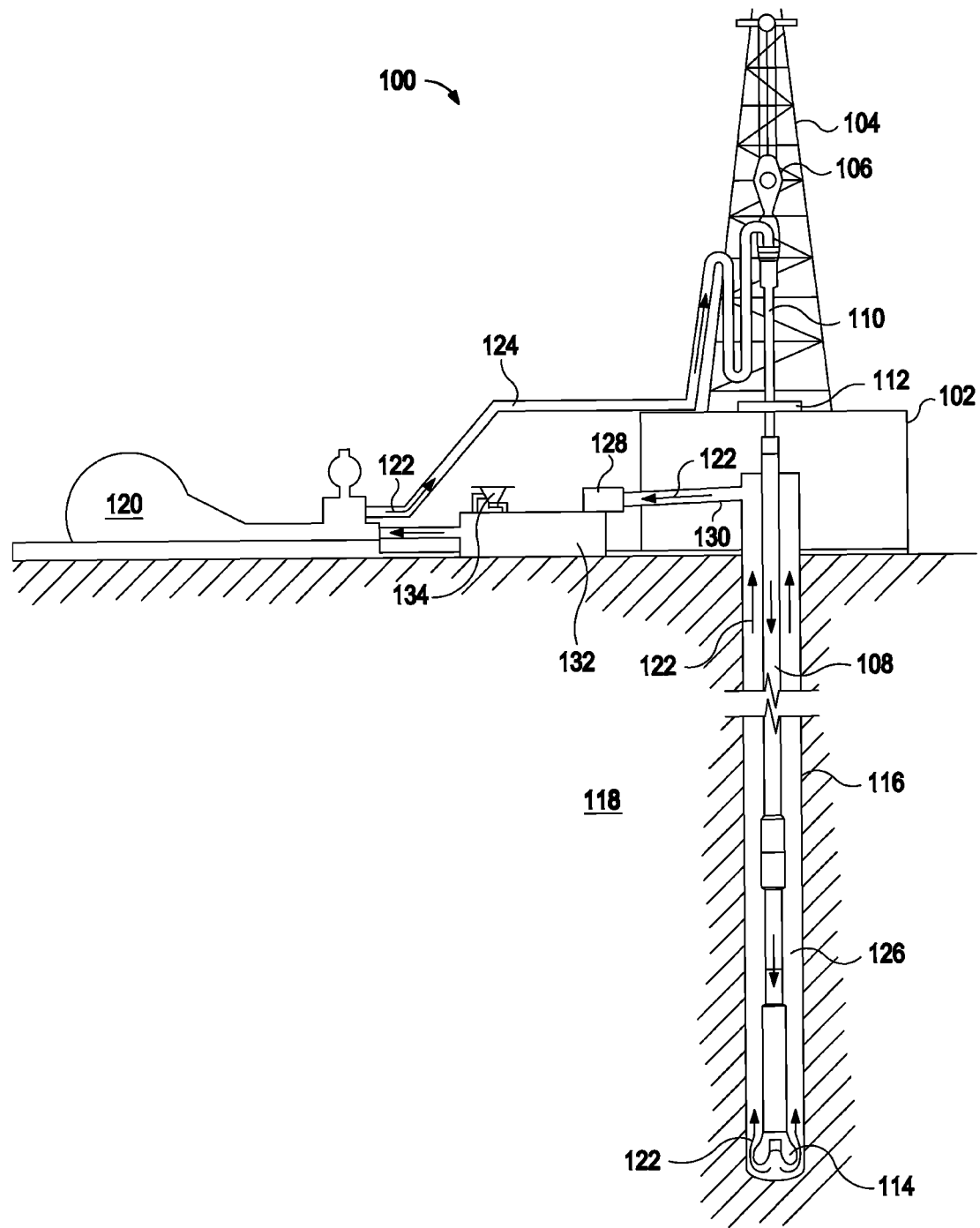

BREAKABLE EMULSIFIERS

BACKGROUND

Oilfield emulsions tend to be a classical emulsion including an oleaginous fluid (oleaginous phase), non-oleaginous fluid (non-oleaginous phase), and an emulsifier. A number of downhole operations use oilfield emulsions, including but not limited to, drilling operations. While oilfield emulsions are typically invert emulsions having a continuous oleaginous phase and a discontinuous non-oleaginous phase, direct emulsions having a continuous non-oleaginous phase and discontinuous oleaginous phase may also be used. In oilfield emulsions, the interfacial tension between the oleaginous phase and non-oleaginous phase is often high. Thus, if the liquids are mixed together, they spontaneously separate from each other when the agitation ceases, to minimize the interfacial area. Lowering the interfacial tension with an emulsifier enables one liquid to form a stable dispersion of fine droplets in the other. The lower the interfacial tension, the smaller the droplets and the more stable the emulsion.

After use, it may be desired to separate the solids from the oilfield emulsion to allow, for example, recycle and re-use of the base fluid (e.g., oleaginous fluid), whether in the same or different downhole operation. A number of techniques have been developed for separation of the oil and non-oleaginous phases in oilfield emulsions. Techniques for separation include mechanical-, solvent-, and thermal-based processes. Thermal-based processes used heat to facilitate separation of the oil, water, and solids. Heat may aid in solids removal by mechanical means or it can be increased to where the separation process becomes a distillation process. Thermal-based processes may require significantly more energy than either mechanical or solvent based methods of emulsion breaking, regardless of the heat source (indirectly fired calciners, microwave, friction-based heat, electrical, etc.).

However, the more oilfield emulsions, such as drilling fluids, are used, the smaller the retained solids become until they reach colloidal size. With extended periods of reuse of these oilfield emulsions, the classical emulsions become further stabilized by these colloidal solids. In some instances, invert emulsion fluids can reach a point where they are considered permanently emulsified. This permanent emulsion hinders the recycle of valuable fluids components (e.g., base oils) because the permanent emulsion cannot be easily destabilized for separation of the oil and non-oleaginous phases by conventional separation techniques.

BRIEF DESCRIPTION OF THE DRAWINGS

These drawings illustrate certain aspects of some of the embodiments of the present disclosure and should not be used to limit or define the disclosure.

The FIGURE is a schematic diagram of an example drilling assembly.

DETAILED DESCRIPTION

Disclosed herein are methods of system for breaking oilfield emulsions. More particularly, systems and methods may be provided for that use a breakable emulsifier to facilitate separation of the oil and non-oleaginous phase in oilfield emulsions. The breakable emulsifier may include a breakable linkage connecting a cleavable hydrophobic portion and a hydrophilic portion. When a trigger is applied to the breakable emulsifier, the breakable linkage is cleaved separating the cleavable hydrophobic portion and the hydrophilic portion, thus removing the emulsifying properties. With the emulsifying properties removed, the oil and non-oleaginous phases should readily separate, thus allowing recovery and reuse of fluid components.

There may be several potential advantages to the systems and methods disclosed herein, only some of which may be alluded to herein. One of the many potential advantages may be that the system and methods may provide efficient, cost-effective emulsion breaking solutions. In some cases, conventional invert emulsions may have high energy requirements for breaking. In contrast, disclosed processes and methods may be performed at temperature and pressure conditions requiring a low energy input per unit of the recovered drilling fluid components. Another potential advantage drilling waste may be minimized while maximizing the recovery and reuse of the drilling fluid components, including the oleaginous fluid, aqueous fluid, and low gravity solids. In some cases, conventional emulsion drilling fluids may be difficult to break using conventional means, and thus may necessitate recovery and storage. However, the disclosed methods and systems should readily break the oilfield emulsion upon application of the triggers as the emulsifying properties of the emulsifier are broken, thus allowing recover and reuse of fluid components in oilfield emulsions that otherwise require storage. Additionally, because the process requires relatively low temperature and pressure, there may be no destruction or modification of drilling fluid additives, such as wetting agents, rheology modifiers, and filtration control additives, among others. Further, the process may operate below the temperatures at which certain oleaginous fluids commonly used in drilling fluids may degrade. Furthermore, due to temperature and pressure needs, the process and methods offer safer conditions for humans and environment.

The oilfield emulsions of the present disclosure may be useful in the drilling, completion and working over of subterranean oil and gas wells. In some embodiments, the oilfield emulsions may be useful in formulating drilling fluids and completion fluids that facilitate removal of a filter cake from a subterranean formation or well bore. Such drilling and completions may be especially useful in drilling horizontal wells into hydrocarbon bearing formations. Any of a variety of suitable techniques may be used for preparation of the oilfield emulsions, including those normally used, to prepare conventional invert emulsions for drilling fluids. In one example, a desired quantity of oleaginous fluid such as a base oil and a suitable amount of breakable emulsifier are mixed together and the remaining components (e.g., the non-oleaginous fluid) are added sequentially with continuous mixing. In some embodiments, an oilfield emulsion in the form of an invert emulsion may be formed by vigorously agitating, mixing or shearing the oleaginous fluid, non-oleaginous fluid, and breakable emulsifier.

Examples of suitable oilfield emulsions include oil-based or synthetic-based oilfield emulsions in the form of invert or direct emulsions. An example of a suitable oilfield emulsion may be in the form of an invert emulsion that includes an oleaginous continuous phase and a non-oleaginous discontinuous phase. Another example of a suitable oilfield emulsion may be in the form of a direct emulsion that includes a non-oleaginous continuous phase and an oleaginous discontinuous phase. Whether invert or direct emulsion, the ratio of the continuous phase to discontinuous phase in the oilfield emulsion, for example, may be in the range of 20:80 v/v CDR (continuous phase to discontinuous phase ratio) to 99:1 v/v CDR or, alternatively 20:80 v/v CDR to 90:10 v/v CDR or, alternatively 20:80 v/v CDR to 50:50 v/v CDR. The continuous phase (e.g., non-oleaginous phase) can be any suitable vol % of the oilfield emulsion. For example, the continuous phase can be about 1 vol % to about 99 vol % of the oilfield emulsion, about 10 vol % to about 50 vol %, or about 1 vol % or less, or about 2 vol %, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 vol % or more of the oilfield emulsion.

The breakable emulsifier is used for promoting the formation and stabilization of the oilfield emulsions. Accordingly, by inclusion of the breakable emulsifier, an oilfield emulsion that includes an oleaginous phase and a non-oleaginous phase may be prepared. In certain embodiments, upon application of a trigger, the breakable emulsifier should degrade into non-emulsifying compounds, thus breaking the oilfield emulsion. When an emulsion is broken, the oil and water separate and return to an unmixed state. The amount of the breakable emulsifier present in the oilfield emulsion should be sufficient to form a stable emulsion that is capable of remaining substantially emulsified at ambient conditions for more than about 1 minute after the halting of the agitation or shearing motion that forms the oilfield emulsion. The concentration of the breakable emulsifier may vary depending on the particular components in the oilfield emulsion. In some embodiments, the breakable emulsifier is present in the oilfield emulsion in an amount of about 10% by volume of the oilfield emulsion or less. In some embodiments, the breakable emulsifier is present in an amount of about 0.1% to about 10.0% by volume. In some embodiments, the breakable emulsifier is present in an amount of about 0.1% to about 5.0% by volume. In some embodiment, the breakable emulsifier is present in an amount of about 1% to 5.0% by volume.

Because the breakable emulsifier has built into its structure a bond with limited stability, degradation of this bond should at least partially decrease the surface activity of the breakable emulsifier. In some embodiments, the breakable emulsifier may cleave at the breakable linkage connecting the cleavable hydrophobic portion and the hydrophilic portion, resulting in the instantaneous disappearance of the surface activity for the breakable emulsifier. Upon degradation by cleaving of the breakable linkage, the breakable emulsifier should degrade into by-products that are non-emulsifiers. The rate at which breakable emulsifier degrades are dependent on a number of factors, including the type of breakable linkage, temperature, concentration, and pH. Also, the trigger to which the breakable emulsifier is subjected also affects how it degrades. Examples of triggers for degradation of the breakable emulsifier include acid, fluoride, light, oxidizer, and base.

The breakable emulsifier should be suitable for use at temperatures that they will encounter during subterranean operations, for as long a time period as maintenance of their emulsifying activity is desired for the particular end use. Generally, the rates of degradation should increase with increasing temperature. One of ordinary skill in the art, with the benefit of this disclosure, should be able to determine the appropriate breakable emulsifiers to use based on, among other things, the particular bottomhole temperatures that may be encountered.

The function that a particular breakable emulsifier useful in the present invention may perform depends on a variety of factors. These factors may include, but are not limited to, the choice of the hydrophobic and hydrophilic portions and the relative amounts thereof, and the presence of any cationic, ionic, non-ionic, amphoteric, or Zwitterionic groups. For example, whether direct (oil-in-water) or invert (water-in-oil) emulsion is formed may be determined by the relative hydrophobicity of the hydrophobic portion and the hydrophilicity of the hydrophilic portion. The hydrophilic/lipophilic balance ("HLB") of the breakable emulsifier may provide a quantitative prediction of whether the breakable emulsifier will facilitate the formation of direct or invert emulsion. HLB is a well-known system that can be determined from the chemical formula of the breakable emulsifier using empirically determined group numbers. Even the HLB system, however, is only semi-empirical, and other factors (such as the relative phase volume of oleaginous and non-oleaginous fluids) may have a considerable influence on the type of emulsion formed.

The breakable emulsifier may include a cleavable hydrophobic portion, a hydrophilic portion, and a breakable linkage connecting the cleavable hydrophobic portion and the hydrophilic portion. A cleavable hydrophobic portion is a molecular framework that is introduced onto a substrate by chemical modification of a functional group. The cleavable hydrophobic portion can be considered a reversible derivative of the original functional group. Cleavable hydrophobic portions are sometimes referred to as protecting groups in synthetic organic chemistry and are typically used in organic synthesis to obtain chemical selectivity in a subsequent chemical reaction. For example, protecting groups are typically added to protect parts of the substrate that cannot survive the required reagents or chemical environments. The protecting group is coupled to the substrate by a breakable linkage so that it can be subsequently removed. This removal step is called deprotection. In the present application, cleavable hydrophobic portions or protecting groups are not being added to the substrate for protection of the functional group in a subsequent reaction, but rather are introduced to provide reversible hydrophobic functionality. For example, the addition of the cleavable hydrophobic portion provides a breakable linkage coupling it to the hydrophilic portion that can be subsequently broken through application of a suitable trigger.

The cleavable hydrophobic portion can be added onto any of a variety of suitable substrates. Examples of suitable substrates include alcohols, amines, alkanolamines (e.g., ethanolamine), hydroxyl-containing groups, carbonyl groups, thiols, alkynes, sulfates, sulfonates, carboxylates, and phosphates. As previously described, the cleavable hydrophobic groups may be added onto the substrate by chemical modification of a functional group on the substrate. Examples of functional groups that can be modified with the cleavable hydrophobic groups include alcohols, hydroxyls, amines, carbonyls, carboxylates, phosphates, terminal alkynes, and carbonates. Protecting groups are typically named based on the functional group it protects. Accordingly, the cleavable hydrophobic portion may include, for example, a hydrophobic hydroxyl protecting group, a hydrophobic amine protecting group, a hydrophobic carbonyl protecting group, a hydrophobic carboxylate protecting group, a hydrophobic phosphate protecting group, a hydrophobic alkyne protecting group, or a hydrophobic carbonate protecting group. The specific derivatives of the functional group forming the cleavable hydrophobic portion will depend on the technique used.

The cleavable hydrophobic group should be selected to provide the desired emulsifying properties while also ensuring adequate stability of the breakable linkage during downhole operations. Suitable cleavable hydrophobic groups may be based on ethers, silyl ethers, silyl alkynes, esters, trityls, and acetals. Suitable silyl ethers may include trimethyl silyl (TMS) ethers, triethyl silyl (TES) ethers, triisopropylsilyl (TIPS), tert-butydimethylsilyl (TBDMS) ethers, tert-butyldiphenlsilyl (TBDPS) ethers. In some embodiments, cleavable hydrophobic portions that are added to hydroxyl groups may be based on a silyl ether or ether (e.g., a trityl ethers, benzyl ethers). Cleavable hydrophobic portions based on silyl ethers may be readily broken, for example, using fluoride or acid triggers. Cleavable hydrophobic portions based on trityl ethers may be readily broken, for example, using an acid trigger. Cleavable hydrophobic portions based on benzyl ethers (e.g., nitrobenzyl ether) may be readily broken, for example, using a light trigger. In some embodiments, a cleavable hydrophobic portion added to an amine may be based on a trityl groups. Cleavable hydrophobic portions based on trityl groups may be readily broken, for example, using an acid trigger. In some embodiments, a hydrophobic alkyne protecting group may be based on a silyl alkyne. Cleavable hydrophobic portions based on silyl alkynes may be readily broken, for example, using a fluoride trigger. In some embodiments, a cleavable hydrophobic protecting group added to a carboxyl group may be based on an ester, such as a phenyl ester. Cleavable hydrophobic portions based on phenyl ester may be readily broken, for example, using an oxidizer and/or base trigger.

The hydrophilic portion on the breakable emulsifier may include any suitable hydrophilic groups as desired by one of ordinary skill in the art, with the benefit of this disclosure, for a particular application. Examples of suitable hydrophilic groups of the hydrophilic portion include ethylene oxide, sulfates, sulfonates, carboxylates, phosphates, phosphonium cations, primary amines, secondary amines, tertiary amines, and quaternary ammonium salts. Suitable hydrophilic groups may include non-ionic, cationic, and anionic groups. In some embodiments, the hydrophilic group can be added to a substrate. For example, the base substrate can be ethoxylated by addition of ethylene oxide to provide a hydrophilic portion. The ethylene oxide may be added in any suitable amount, for example, from 1-12 units of ethylene oxide may be added to each substrate. Suitable substrates of ethylene oxide addition include, for example, alcohols, alkanolamines (e.g., ethanolamine), and other compounds with hydroxyl functional groups. In some embodiments, the substrate may already include a cationic hydrophilic group, such as a primary, secondary, tertiary or quaternary amine. In some embodiments. The substrate may already include an anionic hydrophilic group, such as sulfates, sulfonates, carboxylates, phosphates.

An example of a suitable breakable emulsifier may be formed from an amine, such as an alkanolamine (e.g., ethanolamine, diethanolamine) or polyetheramine. Because alkanol amines has both an amino substituent and a hydroxy substituent, the cleavable hydrophobic portion may be added by reaction with either of the amine group or the alcohol group. For example, the cleavable hydrophobic portion may be onto the molecule by modification of the alcohol. Examples of suitable cleavable hydrophobic portions added to alcohols include, but are not limited to, silyl ethers, ethers, esters, and acetals. By way of further example, the cleavable hydrophobic portion may be introduced into the molecule by modification of the amine. Examples of suitable cleavable hydrophobic protecting groups added to amines include trityl groups, carbamate groups, allyl groups, benzyl groups, and amide groups. Any suitable hydrophilic group may be added onto the ethanolamine to add a hydrophilic portion. For example, the amine may be ethoxylated with up to about 12 units or more of ethylene oxide. By way of further example, the primary alcohol may be ethoxylated with up to about 12 units or more of ethylene oxide. For example, the breakable emulsifier may include a hydrophilic portion including a polyethylene glycol (PEG) group with from 1 to 12 ethylene oxides. Other suitable hydrophilic portions include carboxylates, phosphates, phosphonium, sulfonates and ammonium groups.

Structures 1-4 below illustrate breakable emulsifiers formed from monoethanol amine that are non-ionic. In each structure, the breakable emulsifier includes a cleavable hydrophobic portion linked to an oxygen atom based on a silyl ether and a hydrophilic portion including an ethoxylated amine.

Structure 1

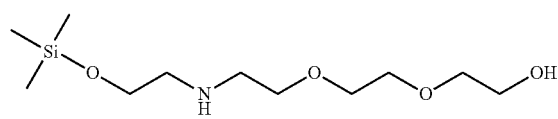

Structure 2

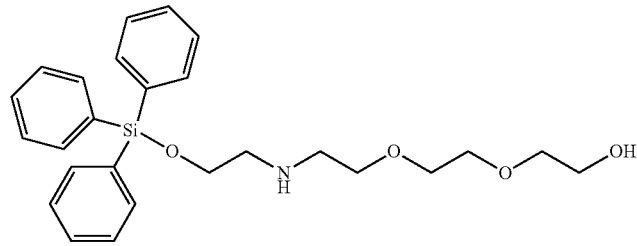

Structure 3

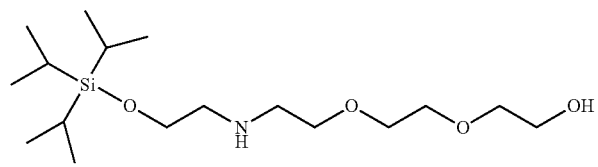

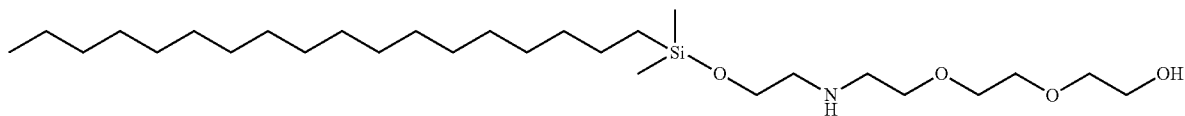

Structure 4

Reaction 1 below shows degradation of the breakable emulsifier from application of a fluoride or acid trigger. As illustrated, the breakable linkage between the oxygen and silicon is degraded to break the breakable emulsifier.

Reaction 1

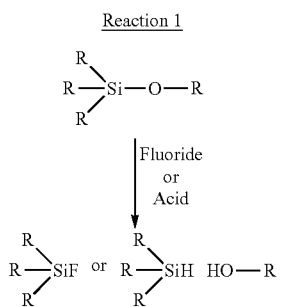

Structure 5 below illustrates a breakable emulsifier formed from monoethanol amine that is non-ionic. In Structure 5, the breakable emulsifier includes a cleavable hydrophobic portion linked to the amine based on a trityl group and a hydrophilic portion including an ethoxylated alcohol.

Structure 5

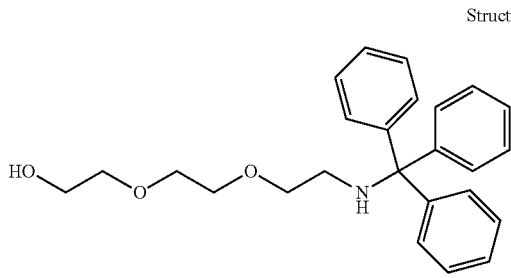

Reaction 2 below shows degradation of the breakable emulsifier from application of an acid trigger. As illustrated the breakable linkage between the nitrogen and carbon is degraded to break the breakable emulsifier.

Reaction 2

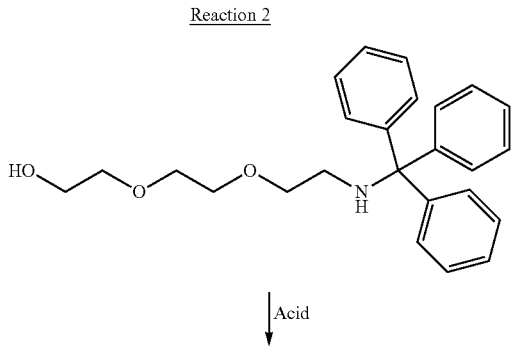

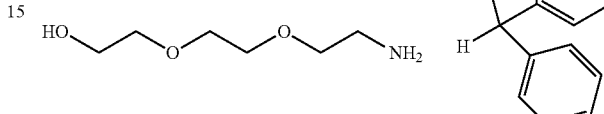

Another example of a suitable breakable emulsifier may be formed from alkyne, such as propargyl alcohol. Any of a variety of suitable cleavable hydrophobic portions linked to alkynes may be used, including, but not limited to, triaklysilanes. Any of a variety of suitable hydrophilic group may be added onto the alcohol to add a hydrophilic portion. For example, the alcohol may be ethoxylated with up to about 12 moles or more of ethylene oxide. In some embodiments, the breakable emulsifier may include a hydrophilic portion including a polyethylene glycol (PEG) group with from 1 to 12 ethylene oxides. Other suitable hydrophilic portions include carboxylates, phosphates, phosphonium, sulfonates and ammonium groups.

Structure 6 below illustrates a breakable emulsifier formed from propargyl alcohol that is non-ionic. In Structure 6, the breakable emulsifier includes a cleavable hydrophobic portion linked to an alkyne based on silylalkyne and a hydrophilic portion including an ethoxylated alcohol.

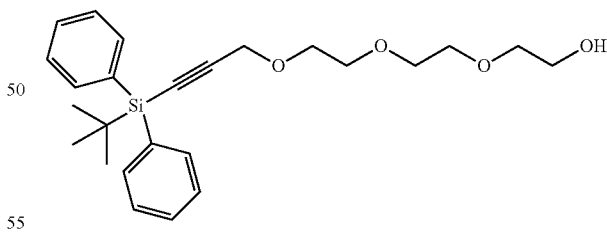

Structure 6

Reaction 3 below shows degradation of the breakable emulsifier from application of a fluoride trigger. As illustrated the breakable linkage between the carbon and silicon is degraded to break the breakable emulsifier.

Reaction 3

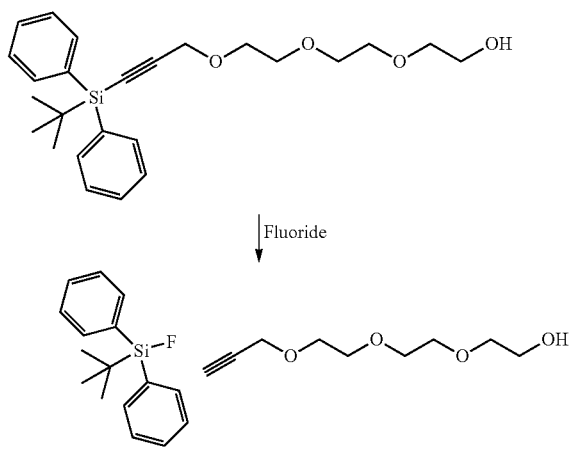

Another example a suitable breakable emulsifier may be formed from a quaternary ammonium compound, such as choline. Any of a variety of suitable cleavable hydrophobic portions linked to the oxygen of choline may be used, including, but not limited to, ethers, esters, and acetals. The quaternary ammonium head group may function as the hydrophilic portion of the resulting breakable emulsifier.

Structure 7 below illustrates a breakable emulsifier formed from choline that is cationic. In Structure 7, the breakable emulsifier includes a cleavable hydrophobic portion connected to an oxygen atom based on a trityl ether and a hydrophilic portion including a quaternary ammonium head group.

Structure 7

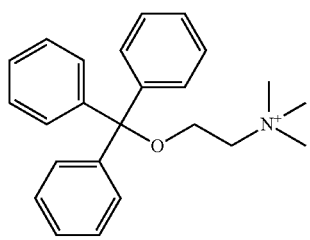

Reaction 4 below shows degradation of the breakable emulsifier from application of an acid trigger. As illustrated, the breakable linkage between the carbon and oxygen is degraded to break the breakable emulsifier.

Reaction 4

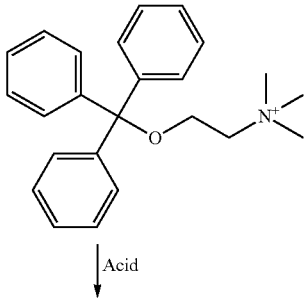

-continued

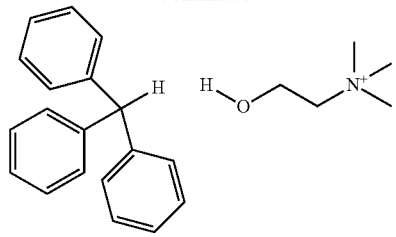

Structure 8 below illustrates a breakable emulsifier formed from choline that is cationic. In Structure 8, the breakable emulsifier includes a cleavable hydrophobic portion based on a methoxytrityl ether and a hydrophilic portion including a quaternary ammonium head group.

Structure 8

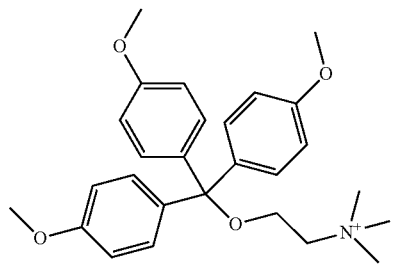

Reaction 5 below shows degradation of the breakable emulsifier from application of an acid trigger. As illustrated the breakable linkage between the carbon and oxygen is degraded to break the breakable emulsifier.

Reaction 5

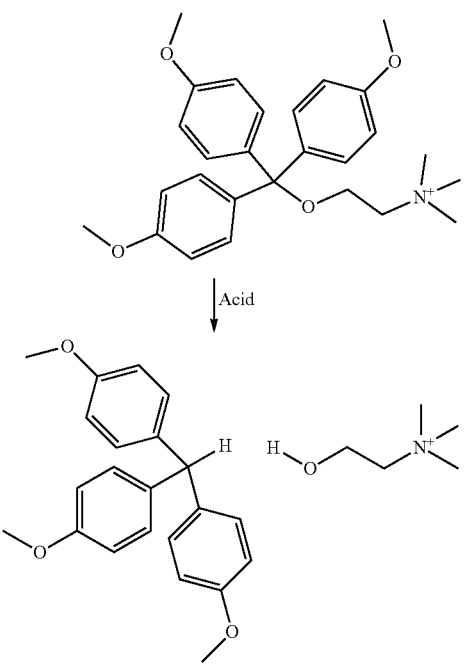

Structure 9 below illustrates a breakable emulsifier formed from choline that is cationic. In Structure 9, the breakable emulsifier includes a cleavable hydrophobic portion based on nitrobenzyl ether and a hydrophilic portion including a quaternary ammonium head group.

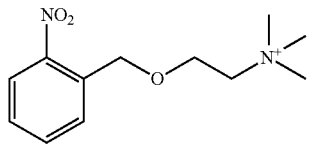

Structure 9

Reaction 6 below shows degradation of the breakable emulsifier from application of a UV trigger. As illustrated, the breakable linkage between the carbon and oxygen is degraded to break the breakable emulsifier.

Reaction 6

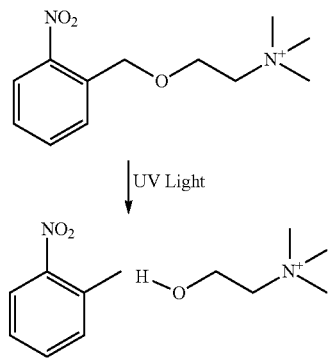

An example of suitable breakable emulsifier may be formed from a carboxylic acid, such as citric acid. Because citric acid has both carboxyl groups and a primary alcohol, the cleavable hydrophobic portion may be added by reaction with either of the carboxyl groups or the tertiary alcohol. For example, the cleavable hydrophobic portion may be introduced onto the molecule by modification of the tertiary alcohol. Examples of suitable cleavable hydrophobic portions by way of alcohol modification include, but are not limited to, silyl ethers, ethers, esters, and acetals. By way of further example, the cleavable hydrophobic portion may be introduced into the molecule by modification of the carboxyl groups. Examples of suitable cleavable hydrophobic portions by way of carboxyl modification include esters and orthoesters. Any suitable hydrophilic group may be added onto the tertiary alcohol to add a hydrophilic portion. For example, the tertiary alcohol may be ethoxylated with up to about 12 moles or more of ethylene oxide. For example, the breakable emulsifier may include a hydrophilic portion including a polyethylene glycol (PEG) group with from 1 to 12 ethylene oxides. Other suitable hydrophilic portions include phosphates, phosphonium, sulfonates and ammonium groups. In some embodiments, the anionic carboxylate groups on the molecule can function as the hydrophilic portion.

Structure 10 below illustrates a breakable emulsifier formed from citric acid that is nonionic. In Structure 10, the breakable emulsifier includes a cleavable hydrophobic portion based on a phenyl ester and a hydrophilic portion including an ethoxylated alcohol.

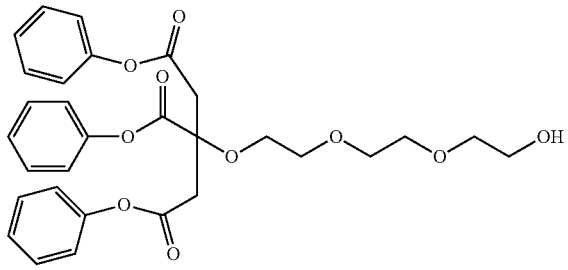

Structure 10

Reaction 7 below shows degradation of the breakable emulsifier from application of an oxidizer and base trigger. As illustrated, the breakable linkage between the carbon on the ring and oxygen is degraded to break the breakable emulsifier.

Reaction 7

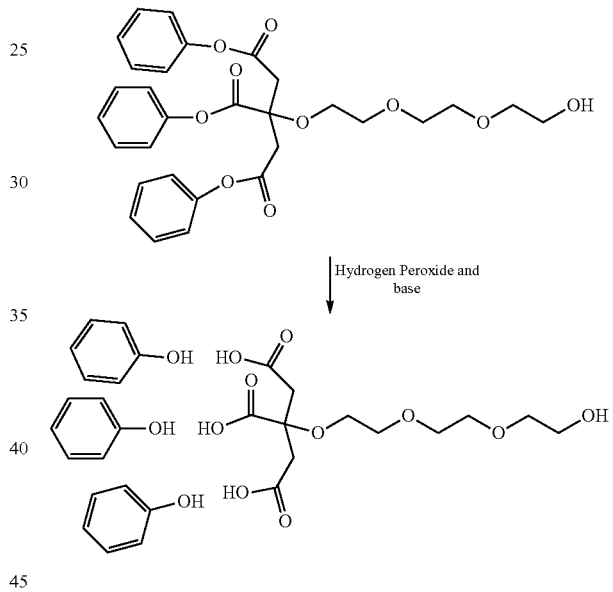

Structure 11 below illustrates a breakable emulsifier formed from citrate that is anionic. In Structure 11, the breakable emulsifier includes a cleavable hydrophobic portion by way of alcohol modification based on a silyl ether and a hydrophilic portion including anionic carboxylate groups.

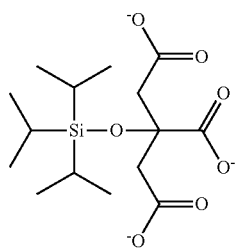

Structure 11

Reaction 8 below shows degradation of the breakable emulsifier from application of an acid or fluoride trigger. As illustrated, the breakable linkage between the silicon and oxygen is degraded to break the breakable emulsifier.

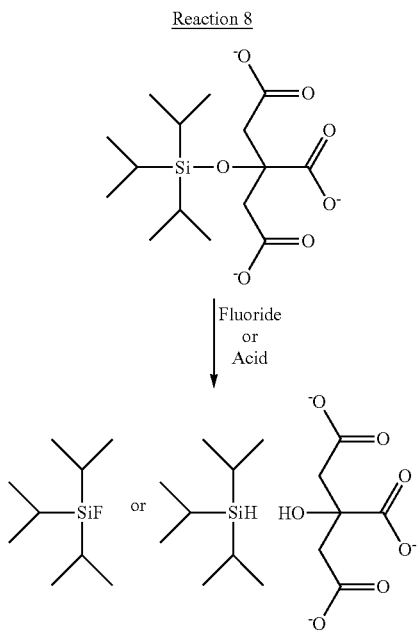

Reaction 8

The oilfield emulsion may further include an oleaginous fluid in the oleaginous phase, which may be either the continuous or discontinuous phase, depending on whether the oilfield emulsion is an invert of direct emulsion. Where used in an invert emulsion, the oleaginous fluid may also be referred to as a "base fluid." The oleaginous fluid may include any oil-based and synthetic-based fluids suitable for use in oilfield emulsions. The oleaginous fluid may be from a natural or synthetic source. Examples of suitable oleaginous fluids may include, without limitation: diesel oils; crude oils; natural oils, such as paraffin oils and vegetable oils; synthetic oils, such as polyolefins, synthetic paraffins, esters, alpha-olefins, polydiorganosiloxanes, siloxanes, and organosiloxanes; or mixtures thereof. Factors that determine which oleaginous fluid will be used in a particular application, include but are not limited to, the cost and performance characteristics of the oleaginous fluid. An additional factor that may be considered is the polarity of the oleaginous fluid. For example, diesel oils are generally more polar than paraffin oils. Other factors that may be considered are environmental compatibility and regional drilling practices. For example, in North Sea applications, an ester or internal olefin (IO) may be preferred.

In invert emulsion embodiments, the concentration of the oleaginous fluid should be sufficient so that an invert emulsion forms and may be less than about 99% by volume of the invert emulsion. In some embodiments, the oleaginous fluid is present in an amount of about 30% to about 99% by volume. In some embodiments, the oleaginous fluid is present in an amount of about 40% to about 98% by volume. In some embodiments, the oleaginous fluid is present in an amount of about 50% to about 97% by volume. In some embodiments, the oleaginous fluid is present in an amount of about 70% to about 90% by volume. The oleaginous fluid, in some embodiments, may include at least 5% by volume of a material selected from the group including ethers, acetals, dialkylcarbonates, hydrocarbons, and combinations thereof In direct emulsion embodiments, the oleaginous fluid may be in any suitable amount, for example, an amount of less that about 70% by volume of the oilfield emulsion, e.g., from about 1% to about 70% by volume. In some embodiments, the oleaginous fluid is present in an amount of from about 2% to about 60% by volume. In some embodiments, the oleaginous fluid is present in an amount of from about 3% to about 50% by volume. In some embodiments, the oleaginous fluid is present in an amount of from about 10% to about 30% by volume.

The oilfield emulsion may further include a non-oleaginous fluid in the non-oleaginous phase, which may be either the continuous or discontinuous phase, depending on whether the oilfield emulsion is an invert of direct emulsion. In some embodiments, the non-oleaginous fluid is an aqueous fluid, such as freshwater, seawater, or brines containing organic and/or inorganic dissolved salts. In invert emulsion embodiments, the amount of the non-oleaginous fluid is typically less than the theoretical limit needed for forming an invert emulsion. For example, the non-oleaginous fluid may be present in an amount of less that about 70% by volume of the oilfield emulsion, e.g., from about 1% to about 70% by volume. In some embodiments, the non-oleaginous fluid is present in an amount of from about 2% to about 60% by volume. In some embodiments, the non-oleaginous fluid is present in an amount of from about 3% to about 50% by volume. In some embodiments, the non-oleaginous fluid is present in an amount of from about 10% to about 30% by volume. In direct emulsion embodiments, the concentration of the non-oleaginous fluid should be sufficient so that a direct emulsion forms and may be less than about 99% by volume of the direct emulsion. In some embodiments, the non-oleaginous fluid is present in an amount of about 30% to about 99% by volume. In some embodiments, the non-oleaginous fluid is present in an amount of about 40% to about 98% by volume. In some embodiments, the non-oleaginous fluid is present in an amount of about 50% to about 97% by volume. In some embodiments, the non-oleaginous fluid is present in an amount of about 70% to about 90% by volume.

The oilfield emulsions may additionally include additional treatment fluid additives. Examples of suitable treatment fluid additives include drilling fluid additives, such as viscosifiers, weighting agents, surfactants, fluid loss control additives, corrosion inhibitors, scale inhibitors, clay control agents, biocides, and bridging agents, among others. A person skilled in the art, with the benefit of this disclosure, will recognize the types of additives that may be included in the oilfield emulsions of the present disclosure for a particular application.

The oilfield emulsions (e.g., invert emulsions) of the present disclosure may be characterized in terms of various properties, for example, plastic viscosity. In some embodiments, the oilfield emulsions may have a plastic viscosity in the range of from about 10 to about 160 centipoise (cP). In some embodiments, the oilfield emulsions may have a plastic viscosity in the range of from about 15 to about 75 cP. In some embodiments, the oilfield emulsions may have a plastic viscosity in the range of from about 20 to about 50 cP. As used herein, plastic viscosity is measured in accordance with the standard procedures set forth in *Recommended Practice* 13B-2, *Recommended Practice for Field Testing of Oil-based Drilling Fluids*, Fourth Edition, American Petroleum institute. Mar. 1, 2005.

The oilfield emulsions (e.g., invert emulsions) may also be characterized in terms of yield point. In some embodiments, the oilfield emulsions may have a yield point in the range of from about 2 to about 65 lb/100 ft² (about 10 to about 311 kPA). In some embodiments, the oilfield emulsions have a yield point in the range of from about 5 to about 40 lb/100 ft² (about 24 kPA to about 192 kPA). In some embodiments, the oilfield emulsions may have a yield point in the range of from about 8 to about 30 lb/100 ft² (about 38 to 144 kPA). In some embodiments, the oilfield emulsions may have a yield point in the range of from about 10 to about 25 lb/100 ft² (about 48 to 120 kPA). As used herein, plastic viscosity is measured in accordance with the standard procedures set forth in *Recommended Practice* 13B-2, *Recommended Practice for Field Testing of Oil-based Drilling Fluids*, Fourth Edition, American Petroleum Institute, Mar. 1, 2005. As used herein, yield point is measured in accordance with the standard procedures set forth in *Recommended Practice* 13B-2, *Recommended Practice for Field Testing of Oil-based Drilling Fluids*, Fourth Edition, American Petroleum Institute, Mar. 1, 2005.

The oilfield emulsions (e.g., invert emulsions) may also be characterized in terms of 10-second gel strength. In some embodiments, the oilfield emulsions may have a 10-second gel strength in the range of from about 3 to about 50 lb/100 ft² (about 14 to about 239 kPa). In some embodiments, the oilfield emulsions may have a 10-second gel strength in the range of from about 5 to about 30 lb/100 ft² (about 24 to 144 kPa). In some embodiments, the oilfield emulsions may have a 10-second gel strength in the range of from about 7 to about 20 lb/100 ft² (about 34 to about 96 kPa). As used herein, 10-second gel strength is measured in accordance with the standard procedures set forth in *Recommended Practice* 13B-2, *Recommended Practice for Testing of Oil-based Drilling Fluids*, Fourth Edition, American Petroleum Institute, Mar. 1, 2005.

The oilfield emulsions may also be characterized in terms of 10-minute gel strength. In some embodiments, oilfield emulsions may have a 10-minute gel strength in the range of from about 3 to about 65 lb/100 ft² (about 14 to about 311 kPa). In some embodiments, the oilfield emulsions may have a 10-minute gel strength in the range of from about 5 to about 40 lb/100 ft² (about 24 to about 192 kPa). In some embodiment, the oilfield emulsions may have a 10-minute gel strength in the range of from about 7 to about 30 lb/100 ft² (about 34 to about 144 kPa). As used herein, 10-minute gel strength is measured in accordance with the standard procedures set forth in *Recommended Practice* 13B-2, *Recommended Practice for Field Testing of Oil-based Drilling Fluids*, Fourth Edition, American Petroleum institute, Mar. 1, 2005.

The oilfield emulsions of the present disclosure may be prepared using any suitable method and/or equipment (e.g., blenders, mixers, stirrers, etc.). The oilfield emulsions may be prepared at least in part at a well site or at an offsite location. In certain embodiments, the additives of the present disclosure and/or other components of the oilfield emulsions may be metered directly into a base oil with shearing to form an oilfield emulsions. In certain embodiments, the base oil may be mixed with the additives of the present disclosure and/or other components of the oilfield at a well site where the operation or treatment is conducted, either by batch mixing or continuous ("on-the-fly") mixing. In other embodiments, the oilfield emulsions of the present disclosure may be prepared, either in whole or in part, at an offsite location and transported to the site where the treatment or operation is conducted.

The FIGURE illustrates an example drilling assembly 100 in in accordance with certain embodiments. It should be noted that while the FIGURE generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118.

A pump 120 (e.g., a mud pump) may circulate an oilfield emulsion, shown on the FIGURE as drilling fluid 122, through a feed pipe 124 and to the kelly 110, which conveys the drilling fluid 122 downhole through the interior of the drill string 108 and through one or more orifices in the drill bit 114. The oilfield emulsion may be formulated as described above, for example, with a breakable emulsifier. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a screening device (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" drilling fluid 122 may be deposited into a nearby retention pit 132 (i.e., a mud pit) for future reuse. While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While the FIGURE shows only a single retention pit 132, there could be more than one retention pit 132, such as multiple retention pits 132 in series. Moreover, the retention pit 132 may be representative of one or more fluid storage facilities and/or units where the drilling fluid additives may be stored, reconditioned, and/or regulated until added to the drilling fluid 122.

As previously described, it may be desired to recycle and reuse the oilfield emulsion, such as the drilling fluid 122. For example, when spent, the oilfield emulsion is typically disposed. It can be desirable to separate the oilfield emulsion into its constituent parts so that the oleaginous fluid (e.g., the base oil in the invert emulsion) may be recycled and reused in the same or different drilling operation. However, the oilfield emulsion may be difficult to break at it may have reach a point where it considered a persistent, solid-stabilized emulsion that is difficult to separate into its constituent phases. While the oilfield emulsion may contain solids separation equipment (e.g., shale shaker, etc.), the fluid processing unit(s) 128 may not be effective at removing small solids, such as those having a particle size of less than 10 microns. Accordingly, the oilfield emulsion (after use) may still contain at least 2% by weight or, alternatively, at least 5% o by weight or less of solids having a particle size of less than 10 microns (, even after the fluid processing unit(s) 128. The solids may include formation cuttings and weighting agents (e.g., barite, calcium carbonate, hematite and others) in an amount of at least 2% by weight. Often 5% or more by weight of the solids may be left in the oilfield emulsion preventing the fluid to be used again for drilling operations and then the oilfield emulsion may be deemed unusable due to unacceptable fluids properties. By breaking the emulsifier into by products that are not emulsifiers, the components parts of the oilfield emulsion may be separated, thus facilitating their recovery and/or reuse.

A variety of triggers may be used to facilitate degradation of the breakable emulsifier, i.e., deprotection of the protected functional group. In general, the trigger would typically be applied at the surface after the oilfield emulsion has been recovered from the well. The trigger can be applied at the rig site or offsite, for example, at a mud plant. As previously described the triggers should cleave the breakable linkage in the breakable emulsifier, thus separating the cleavable hydrophobic portion and the hydrophilic portion. With the breakable emulsifier degraded into by-products that are non-emulsifying, the emulsifying properties are removed so that the oil and non-oleaginous phases should readily separate, allowing recovery and reuse of fluid components. While temperature may impact rate of degradation, temperature should not be a trigger, and the breakable emulsifiers should generally be stable at anticipated downhole temperatures. Examples of suitable triggers include acid, fluoride, light, oxidizer, and base.

Acid is an example trigger for degradation of the breakable emulsifier. The acid should be capable of cleaving the breakable linkage in the breakable emulsifier, for example, through a chemical reaction. Acid can be used, for example, where the breakable emulsifier is susceptible to acid cleavage at the breakable linkage. Examples of suitable cleavable hydrophobic groups susceptible to acid cleavage include groups based on ethers (e.g., silyl ethers, acetals, etc.), esters, carbamates, amides, trifluoroacetamides, phthalamides, trityl groups, benzyl groups, benzylideneamines, tosylamides, acetals, dioxanes, dioxolanes, dithianes, dithiolanes, hydrazones, oxazolines, and acetyls. Where used, the acid can be added to the oilfield emulsion as the trigger. In some embodiments, the acid may be added in an amount of from about 1% to about 10% by, volume of the oilfield emulsion. In some embodiments, this amount is greater than about 1 equivalent of acid and, may be about 0.1 to about 10 equivalents of acid. Compounds that may be suitable for use as an acid include, mineral acids and organic acids. Exemplary acids should be soluble in water. Examples of mineral acids include hydrochloric acid, sulfuric acid, nitric acid, phosphoric acid, hydrofluoric acid, hydrobromic acid, and combinations thereof. Examples of organic acids include citric acid, tartaric acid, acetic acid, propionic acid, glycolic acid, lactic acid, halogenated organic acids, butyric acid, organosulfonic acids, organophosphoric acids, and mixtures thereof. Acid generating sources, or compounds that generate acid upon dissolution in water, may also be used, for example, acetic anhydride, hydrolyzable esters, hydrolyzable organosulfonic acid derivatives, hydrolyzable organophosphoric acid derivatives, phosphorus trihalide, phosphorous oxyhalide, anhydrous metal halides, sulfur dioxide, nitrogen oxides, carbon dioxide, and mixtures thereof.

Fluoride is another example trigger for degradation of the breakable emulsifier. The fluoride should be a capable of cleaving the breakable linkage in the breakable emulsifier, for example, through a chemical reaction. Fluoride can be used, for example where the breakable emulsifier is susceptible to fluoride cleavage at the breakable linkage. Examples of suitable cleavable hydrophobic groups susceptible to fluoride cleavage include groups based on silylethers, silylalkynes, silylethyl esters, and silyethyl carbamates. Where fluoride is used as the trigger, fluoride ions or a source of fluoride ions can be added to the oilfield emulsions to provide a fluoride ion concentration in the oilfield emulsion of 50 mg/L to 15 g/L, for example. Any suitable source of fluoride ions can be used to provide fluoride ions, including fluoride salts, such as cesium fluoride, calcium fluoride, potassium fluoride, tetrabutylammonium fluoride (TBAF), and mixtures thereof. Other suitable fluoride sources include hydrofluoric acid and trissulfonium difluorotrimethylsilicate.

Light is another example trigger for degradation of the breakable emulsifier. Light can be used, for example, where the breakable emulsifier is susceptible to photocleavage at the breakable linkage. Examples of suitable cleavable hydrophobic groups susceptible to photocleaving include groups based on nitrobenzyl-based groups (e.g., nitrobenzyl ethers), carbonyl-based groups, and benzyl-based groups. Where light is used as the trigger, the oilfield emulsion can be exposed to light. Examples of suitable light may include visible and ultraviolet (UV) light, for example, having a wavelength from 100 nanometers to 600 nanometers. In some embodiments, the light can be UV light having a wavelength of about 100 nanometers to about 400 nanometers. For example, the light can be UVC light having a wavelength of about 100 nanometers to about 280 nanometers. In some embodiments, the oilfield emulsion exposed to UV light from a UV light source. For example, a UV light source can emit light toward the oilfield emulsion. By way of further example, the UV light source can be disposed in the oilfield emulsion such that the UV light is emitted into the oilfield emulsion. In some embodiments, the UV light source can emit UVC light.

Oxidizers are another trigger for degradation of the breakable emulsifier. The oxidizer should be capable of cleaving the breakable linkage in the breakable emulsifier, for example, through a chemical reaction. Oxidizers can be used, for example, where the breakable emulsifier is susceptible to oxidizing cleavage at the breakable linkage. Examples of suitable cleavable hydrophobic groups susceptible to oxidizing cleavage include phenyl esters, carbamates, benzylamines, tritylamines, benzylideneamines, dithianes, dithiolanes, hydrazones, oxazolines, methoxymethyl ethers, tetrahydropyranal ethers, allyl ethers, and benzylidene acetals. Where oxidizers are used, an oxidizer can be added to the oilfield emulsion in an amount of about 0.1 to about 15 pounds per barrel of the oilfield emulsion. Compounds that may be suitable as the oxidizer include peroxides, persulfates, perborates, permanganates, and ozone.

Bases are another trigger for degradation of the breakable emulsifier. The base should be capable of cleaving the breakable linkage in the breakable emulsifier, for example, through a chemical reaction. Bases can be used, for example, where the breakable emulsifier is susceptible to basic cleavage at the breakable linkage. Examples of suitable cleavable hydrophobic groups susceptible to basic cleaving include groups based on ethers (e.g., silyl ethers, acetals, etc.), esters, amides, hydrazones, pivalates, and acetyls. Where bases are used, a base can be added to the oilfield emulsion in an amount of about 0.1 to about 15 pounds per barrel of the oilfield emulsion. Compounds that may be suitable as the base include hydroxides, carbonates, and amines.

Accordingly, the present disclosure may provide that use a breakable emulsifier to facilitate separation of the oil and non-oleaginous phase in oilfield emulsions. The methods and systems may include any of the various features disclosed herein, including one or more of the following statements.

Statement 1. A method for emulsion breaking comprising: applying a trigger to an oilfield emulsion to facilitate breaking of the oilfield emulsion, wherein the oilfield emulsion comprises an oleaginous phase, a non-oleaginous phase, and a breakable emulsifier, wherein the trigger breaks the breakable emulsifier into non-emulsifying byproducts; and separating at least a portion of the oleaginous phase from the non-oleaginous phase.

Statement 2. The method of Statement 1, wherein the trigger comprises an acid.

Statement 3. The method of Statement 1 or Statement 2, wherein the trigger comprises fluoride ions.

Statement 4. The method of any preceding Statement, wherein the trigger comprises light.

Statement 5. The method of any preceding Statement, wherein applying the trigger comprises exposing the oilfield emulsion to light as the trigger, the light having a wavelength of about 100 nanometers to about 600 nanometers.

Statement 6. The method of any preceding Statement, wherein applying the trigger comprises exposing the oilfield emulsion to ultraviolet light as the trigger, the ultraviolet light having a wavelength of about 100 nanometers to about 400 nanometers.

Statement 7. The method of any preceding Statement, wherein the trigger comprises a base.

Statement 8. The method of any preceding Statement, wherein the trigger comprises an oxidizer.

Statement 9. The method of any preceding Statement, wherein the oilfield emulsion is an invert emulsion.

Statement 10. The method of any preceding Statement, wherein the breakable emulsifier comprises a cleavable hydrophobic portion, a hydrophilic portion, and a breakable linkage, wherein the trigger breaks the breakable linkage.

Statement 11. The method of claim 10, wherein the cleavable hydrophobic portion comprises a portion based on a silyl ether, and wherein the breakable linkage is between an oxygen and silicon.

Statement 12. The method of claim 10, wherein the cleavable hydrophobic portion comprises a portion based on a carbamate, a trityl group, an amide, or a benzylidene, and wherein the breakable linkage is between a carbon and nitrogen.

Statement 13. The method of claim 10, wherein the cleavable hydrophobic portion comprises a portion based on one or more silyl alkynes, and wherein the breakable linkage is between a carbon and silicon.

Statement 14. The method of claim 10, wherein the cleavable hydrophobic portion comprises a portion based on an ester, an acetate, a pivalate, a benzoate, a methyl ester, a tert-butyl ester, a benzyl ester, or an alkyl ester, and wherein the breakable linkage is between a carbon and oxygen.

Statement 15. The method of claim 10, wherein the cleavable hydrophobic portion comprises portion based on one or more an ether, a phenyl ether, a nitrobenzyl ether, a benzyl ether, a methoxymethyl ether, a tetrahydropyranaly ether, a tert-butyl ether, an allyl ether, an alkyl ether, or an acetal, and wherein the breakable linkage is between a carbon and oxygen.

Statement 16. The method of any preceding Statement, further comprising recovering the oilfield emulsion from a wellbore prior to applying the trigger.

Statement 17. A method for drilling comprising: extending a wellbore beneath a surface of the Earth; and circulating a drilling fluid through the wellbore while extending the wellbore, wherein the drilling fluid is an oilfield emulsion comprising an oleaginous phase, a non-oleaginous phase, and a breakable emulsifier.

Statement 18. The method of any preceding Statement 17, wherein the oilfield emulsion comprises an invert emulsion.

Statement 19. The method of any preceding Statement 17 or 18, further comprising: recovering the drilling fluid from the wellbore; applying a trigger to the drilling fluid to facilitate breaking of the oilfield emulsion, wherein the trigger breaks the breakable emulsifier into non-emulsifying byproducts; and separating at least a portion of the oleaginous phase from the non-oleaginous phase.

Statement 20. An oilfield emulsion, comprising: an oleaginous phase, a non-oleaginous phase, and a breakable emulsifier, wherein the breakable emulsifier comprises a cleavable hydrophobic portion, a hydrophilic portion, and a breakable linkage, wherein a trigger breaks the breakable linkage.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method for emulsion breaking comprising:
   recovering an oilfield emulsion from a wellbore;
   applying a trigger to the oilfield emulsion comprising an oleaginous phase, a non-oleaginous phase, and a breakable emulsifier, wherein the trigger breaks the breakable emulsifier into a broken emulsifier and non-emulsifying byproducts so that the oleaginous portion and the non-oleaginous portion readily separate and stay in an unmixed state; and
   separating at least a portion of the oleaginous phase from the non-oleaginous phase.

2. The method of claim 1, wherein the trigger comprises an acid.

3. The method of claim 1, wherein the trigger comprises fluoride ions.

4. The method of claim 1, wherein the trigger comprises light.

5. The method of claim 1, wherein applying the trigger comprises exposing the oilfield emulsion to light as the trigger, the light having a wavelength of about 100 nanometers to about 600 nanometers.

6. The method of claim 1, wherein applying the trigger comprises exposing the oilfield emulsion to ultraviolet light as the trigger, the ultraviolet light having a wavelength of about 100 nanometers to about 400 nanometers.

7. The method of claim 1, wherein the trigger comprises a base.

8. The method of claim 1, wherein the trigger comprises an oxidizer.

9. The method of claim 1, wherein the oilfield emulsion is an invert emulsion.

10. The method of claim 1, wherein the breakable emulsifier comprises a cleavable hydrophobic portion, a hydrophilic portion, and a breakable linkage, wherein the trigger breaks the breakable linkage.

11. The method of claim 10, wherein the cleavable hydrophobic portion comprises a portion based on a silyl ether, and wherein the breakable linkage is between an oxygen and silicon.

12. The method of claim 10, wherein the cleavable hydrophobic portion comprises a portion based on a carbamate, a trityl group, an amide, or a benzylidene, and wherein the breakable linkage is between a carbon and nitrogen.

13. The method of claim 10, wherein the cleavable hydrophobic portion comprises a portion based on one or more silyl alkynes, and wherein the breakable linkage is between a carbon and silicon.

14. The method of claim 10, wherein the cleavable hydrophobic portion comprises a portion based on an ester, an acetate, a pivalate, a benzoate, a methyl ester, a tert-butyl ester, a benzyl ester, or an alkyl ester, and wherein the breakable linkage is between a carbon and oxygen.

15. The method of claim 10, wherein the cleavable hydrophobic portion comprises portion based on one or more an ether, a phenyl ether, a nitrobenzyl ether, a benzyl ether, a methoxymethyl ether, a tetrahydropyranaly ether, a tert-butyl ether, an allyl ether, an alkyl ether, or an acetal, and wherein the breakable linkage is between a carbon and oxygen.

16. The method of claim 1, wherein the breakable emulsifier includes an ethoxylated amine.

17. The method of claim 1, wherein the breakable emulsifier is formed from an alkyne.

18. The method of claim 1, wherein the breakable emulsifier is formed from a quaternary ammonium compound.

19. The method of claim 10, wherein the cleavable hydrophobic portion is based on a silyl ether and wherein the hydrophilic portion includes anionic carboxylate groups.

* * * * *